(12) United States Patent
Panitz et al.

(10) Patent No.: US 12,495,196 B2
(45) Date of Patent: Dec. 9, 2025

(54) CAMERA ADAPTER AND A METHOD FOR MOUNTING A CAMERA

(71) Applicant: TE Connectivity Solutions GmbH, Schaffhausen (CH)

(72) Inventors: Gregor Panitz, Bensheim (DE); Bert Bergner, Bensheim (DE); Matthew Steven Houser, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 65 days.

(21) Appl. No.: 18/755,779

(22) Filed: Jun. 27, 2024

(65) Prior Publication Data

US 2025/0008206 A1 Jan. 2, 2025

(30) Foreign Application Priority Data

Jun. 30, 2023 (DE) .......................... 102023117325.1

(51) Int. Cl.
*H04N 23/54* (2023.01)
*H04N 23/51* (2023.01)
*H04N 23/57* (2023.01)

(52) U.S. Cl.
CPC ............. *H04N 23/54* (2023.01); *H04N 23/51* (2023.01); *H04N 23/57* (2023.01)

(58) Field of Classification Search
CPC ...... G03B 17/561; H04N 23/51; H04N 23/54; H04N 23/57
See application file for complete search history.

(56) References Cited

U.S. PATENT DOCUMENTS

| | | | | |
|---|---|---|---|---|
| 10,298,823 | B2* | 5/2019 | Sauer | H04N 23/57 |
| 11,312,315 | B2* | 4/2022 | McElroy | H04N 23/51 |
| 2020/0106932 | A1* | 4/2020 | Chou | H04N 23/51 |
| 2022/0124235 | A1* | 4/2022 | Wang | H04N 7/183 |

FOREIGN PATENT DOCUMENTS

| | | |
|---|---|---|
| CN | 218446334 U | 2/2023 |
| EP | 1069649 A1 | 1/2001 |
| JP | 2005252430 A | 9/2005 |
| JP | 2011239416 A | 11/2011 |
| JP | 2018091972 A | 6/2018 |

OTHER PUBLICATIONS

Extended European Search Report for European Application No. 24185192.2 dated Oct. 29, 2024.

* cited by examiner

*Primary Examiner* — Amy R Hsu
(74) *Attorney, Agent, or Firm* — Potomac Law Group, PLLC

(57) ABSTRACT

A camera adapter for connecting a camera having an optical axis. The camera adapter comprises an adapter cover for connecting to a camera housing of the camera, the adapter cover and the camera housing form a chamber for a sensor board of the camera. The camera adapter has a connector for connecting the camera adapter to a control unit outside the chamber, a waveguide for transmitting signals from the sensor board to the connector, the waveguide being guided inside the chamber; and a contact surface disposed on the waveguide for contacting the waveguide with the sensor board in the chamber, the waveguide is arranged with the contact surface on a side wall of the camera adapter extending in the direction of the optical axis in order to contact an edge of the sensor board in a contact direction which is perpendicular to the optical axis of the camera.

15 Claims, 10 Drawing Sheets

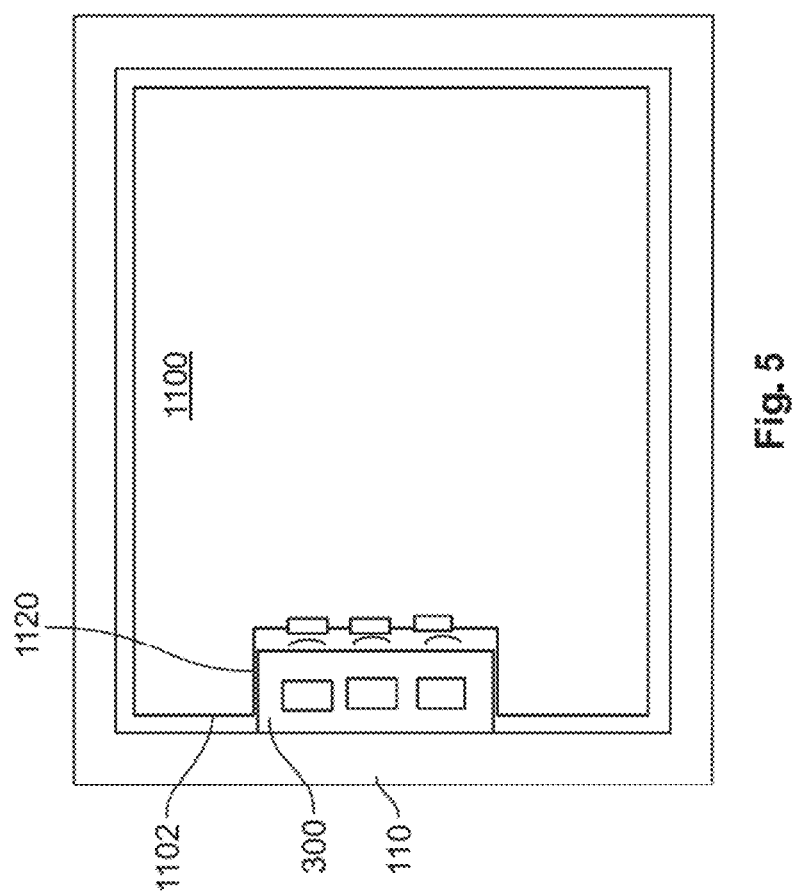

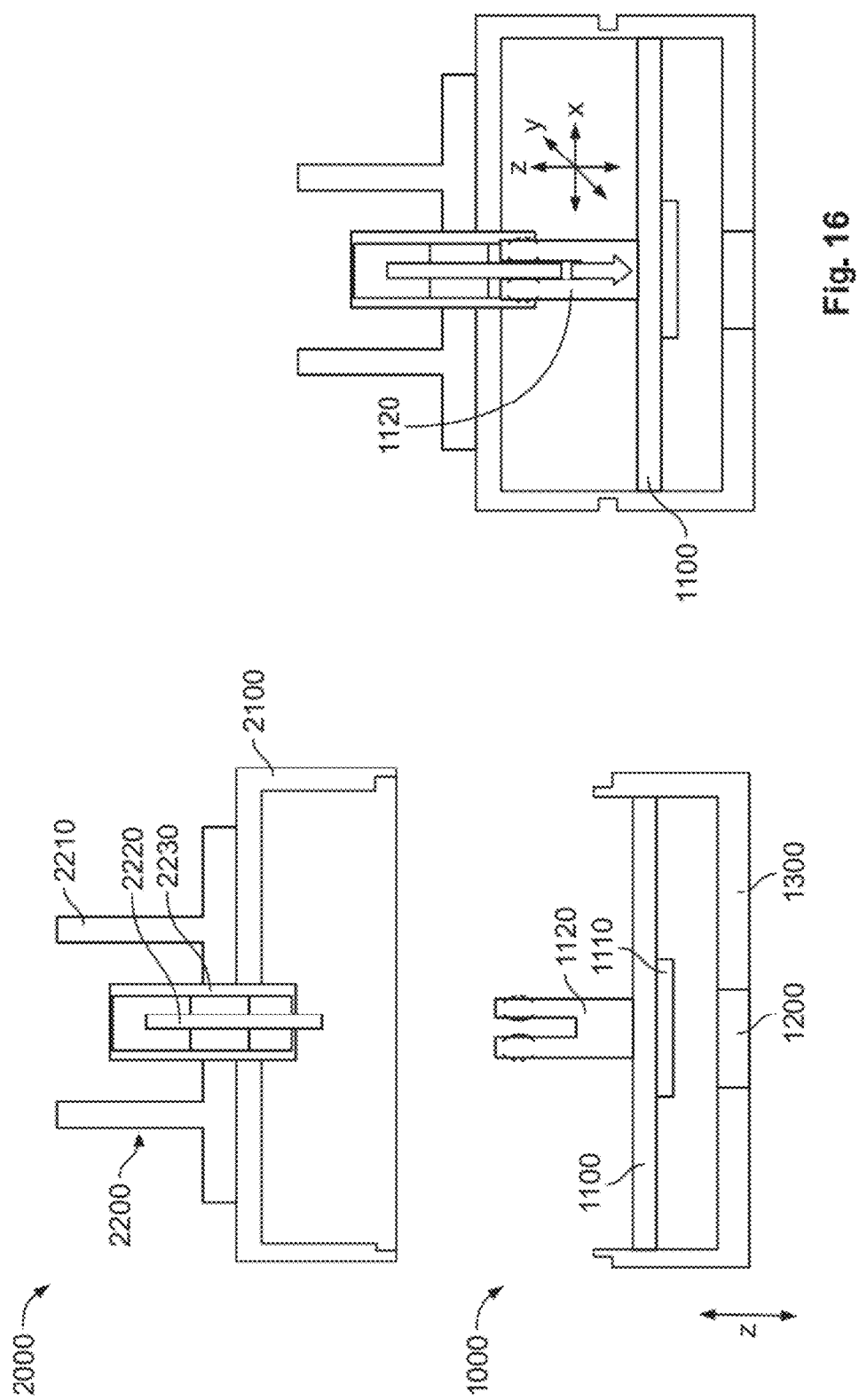

CAMERA ADAPTER AND A METHOD FOR MOUNTING A CAMERA

Figure 1:
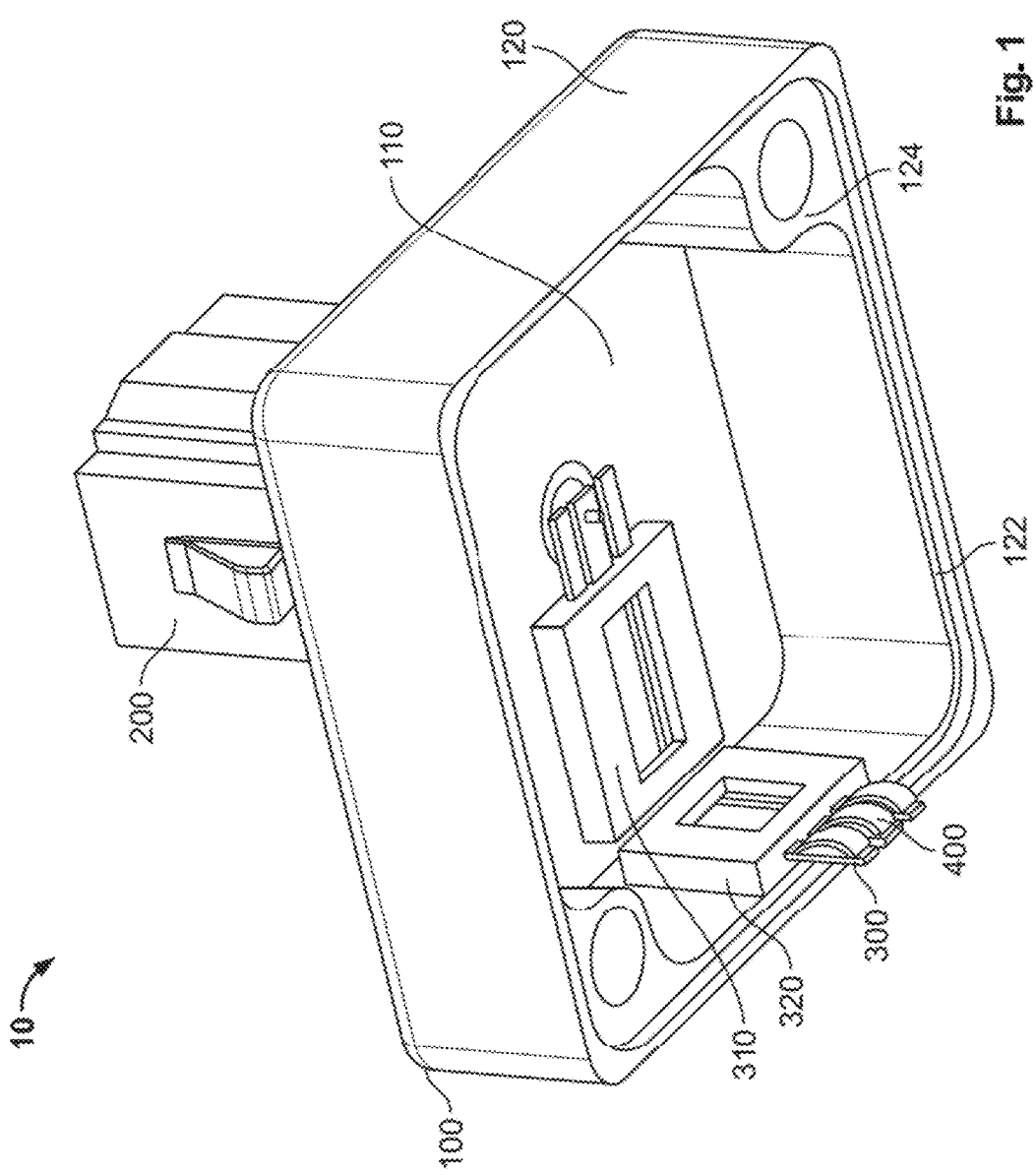

This application claims priority to and the benefit of German Patent Application No. 102023117325.1 filed Jun. 30, 2023, which is hereby incorporated by reference in its entirety.

The subject matter described herein relates to a camera adapter and a method for mounting a camera.

Camera systems have a variety of applications and are used, for example, as part of a higher-level unit. For example, camera systems are used in vehicles, such as cars. The camera system can transmit the camera images to a user, e.g. the driver, as video data and thus increase driving safety.

The higher-level unit usually has a control unit that can be connected to the camera via a connector. Standardized connectors, also referred to herein as plugs, are usually used in vehicles. An adapter is therefore required to connect the camera to a wiring harness of the higher-level unit. An adapter is a connection for the mechanical and electrical connection of different devices with, for example, different nominal widths or connection system standards.

FIG. 15 shows an example of a camera 1000 that can be connected to a higher-level unit not shown by means of a camera adapter 2000.

The camera 1000 comprises a sensor board 1100 with a sensor 1110, e.g. a CCD sensor, which is sensitive to light. Furthermore, the camera 1000 comprises an optical system 1200, e.g. a lens, for imaging an object on the sensor 1110, the optical system being held by a camera housing 1300.

Optics 1200 defines the optical axis Z of the camera. The optical axis (OA) is the axis of symmetry of a symmetrical optical system. The symmetry of the surfaces of the optics is important here. The distance and alignment between sensor 1110 and optics 1300 significantly determine the imaging properties of the camera. For example, the sensor surface is aligned perpendicular to the OA at the focal point of the optics to enable a sharp image.

For use in the higher-level unit, e.g. the vehicle, a camera adapter 2000 is required to connect the sensor 1110 to a control unit in the vehicle, which is not shown. Typically, the camera adapter 2000 has an adapter cover 2100 with a connector 2200, which can be connected to the sensor 1110 via a socket, hereinafter also referred to as connecting unit 1120, on the sensor board 1100. As shown in FIG. 15, a connector 2200 comprises a connector housing 2210, a connection contact 2220 and a shield element 2230.

FIG. 15 shows the camera 1000 and the camera adapter 2000 before installation. FIG. 16 shows the components 1000 and 2000 after installation. In particular, the camera housing 1300 and the adapter cover 2100 are moved towards each other in a connecting direction Z, here parallel to the optical axis Z, so that the sensor board is enclosed in a chamber formed by the camera housing 1300 and the adapter cover 2100. Furthermore, the connecting unit 1120 is connected to the connector 2200 in the assembly step. This establishes an electrical connection between the sensor 1110 and the higher-level unit.

The lens 1200 is usually held by the camera housing 1300. When the camera 1000 and camera adapter 2000 are mounted, the position between the sensor 1110 and the camera housing 1300 may change, since the connecting unit 1120 is connected to the connector 2200. In other words, forces occur that lead to a displacement and/or deformation of the sensor board.

Tolerances are also provided for during assembly to enable installation. These tolerances result, among other things, from the optical requirements, e.g. permissible changes in the alignment of sensor 1110 and optics 1200, and the electrical connection requirements, e.g. secure contacting of connector 2200 and connecting unit 1120.

In particular, it should be noted that the sensor 1110, i.e. the camera sensor chip, is very sensitive and therefore only very low insertion forces in the normal (perpendicular) direction, i.e. in the direction of the optical axis, are permissible on the sensor board 1100. In other words, the tolerance in the direction of the optical axis Z is low in the setup in FIGS. 15 and 16. Insertion forces and tension forces on the sensor board during and after insertion can damage the sensitive sensor 1110. Errors include, for example, bending of the camera itself, which leads to errors in the imaging data.

In the arrangement in FIGS. 15 and 16, the tolerances are large perpendicular to the optical axis Z, i.e. in the X and Y directions. In particular, when mounting the camera, the sensor is aligned with the optics to form the camera. However, the connector 2100, i.e. the electrical interface to the higher-level unit, must be securely contacted by the connecting unit 1120 even if it is offset perpendicular to the optical axis Z. However, misalignment in the X and Y directions leads to an increase in the mating forces, as the springs of the socket and the connector are bent considerably. However, this increases errors in the Z direction.

As shown in FIG. 16, a tolerance compensation socket can be used as a connecting unit 1120 to compensate for these tolerances. As shown in FIG. 16, this socket 1120 is generally located in the center of the sensor board 1100 and therefore takes up a lot of space in a central region of the sensor board 1100.

It should also be noted that the sensors 1110 of the cameras generally have an edge length of greater than or equal to 0.1 mm to less than or equal to 2 cm in the X and Y directions. The size of the sensor 1110 is decisive for the size of the camera. It follows that the sensor board 1100 is usually not much larger than the sensor 1110. In particular, this determines the dimension perpendicular to the optical axis of the camera. The space on the sensor board is therefore usually decisive for the size of the camera. In other words, the space on the sensor board is limited because the sensors can be small. The connecting unit 1120 is particularly problematic, as it is large in comparison to the sensor 1100 in order to ensure tolerance compensation and contacting and therefore takes up a lot of PCB space that could otherwise have been fitted with components, thus making the entire PCB smaller. This connecting unit 1120 is usually arranged on the optical axis or is arranged along the connection axis of the connector 2000.

Figure 17:
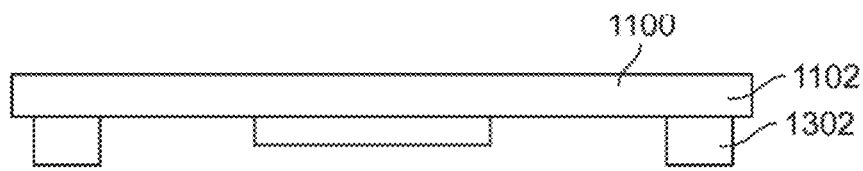
Figure 18:
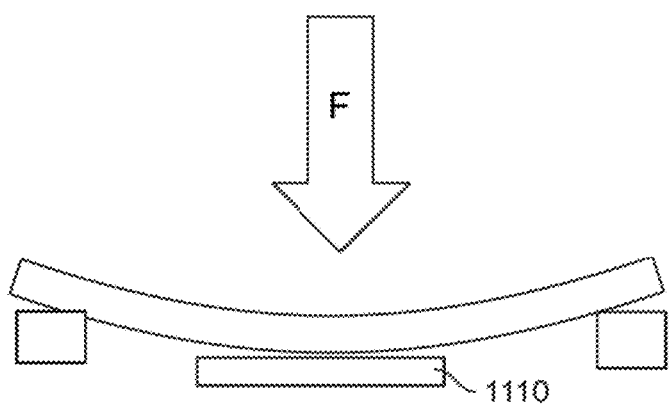

Furthermore, as shown in FIGS. 17 and 18, the insertion forces F are transmitted in the normal direction, i.e. in the Z direction (i.e. in the direction of the optical axis), to the sensor board 1100 at an unfavorable point. As shown in FIG. 17, the sensor board 1100 is held at its edge 1102 by fastening elements 1302, for example provided on the housing 1300. Thus, the surface curvature is maximized by an insertion force in the middle, as shown in FIG. 18. As a result, the sensor 1110 can easily detach from the sensor board.

Furthermore, the electrical contacting of the sensor board takes place during the installation of the camera and camera adapter without a possible visual inspection.

The task is to solve the above problems. In particular, the task is to facilitate non-destructive mounting of the sensor with the camera adapter. In particular, the tolerances for mounting in the direction of the optical axis should be increased. Another task is to minimize the size of the camera. In particular, the space required by the connecting unit on the sensor board should be minimized. A further task is to ensure that the connection between the connector for connecting to the higher-level unit and the sensor enables transmission with high bandwidths. A further task is to ensure reliable electrical contact, even if no visual inspection is possible.

The above tasks are solved by the subject matter of the independent patent claims. Advantageous further developments are the subject of the dependent patent claims.

According to a general aspect, a contact surface arranged on a side wall of the camera adapter extending in the direction of the optical axis solves the above task, since the edge of the sensor board can thus be contacted in a contact direction that is perpendicular to the optical axis of the camera. In particular, this arrangement means that no forces are applied to the sensor board in the direction of the optical axis during contact and the camera's sensor is not stressed. Furthermore, contacting the edge of the sensor board means that the space in the middle of the sensor board does not have to be used for a connecting unit. Usually, the space in the middle of the sensor board can be used advantageously for other units, as these other units can be easily contacted from a variety of directions.

In other words, to avoid the mating forces on the PCB surface and to save space on the PCB, the connection is made at the edge and in particular at a side of the PCB. In this way, the mating forces are applied parallel to the PCB and no socket is required on the PCB. There is therefore no PCB space occupied by a socket. The size of the camera system can be reduced Waveguides are used for the electrical path from an interface of a cable harness connector, the connector, to the sensor board, i.e. to the PBC boarder, so that no encapsulated signal wire within a chamber, which can be a closed shield, is required, but a single conductor with, for example, two outer shield conductors can be used.

The general idea is now described in detail. A first aspect concerns a camera adapter for connecting a camera with an optical axis. As explained above, a camera consists of a sensor and an optical system. In the simplest case, the lens is a hole, i.e. a pinhole camera. By inserting a converging lens into the hole, the camera could be made smaller and the image brighter and sharper. The image is generated by the optics on an electronic sensor on an opposite rear wall of the camera. The camera adapter is used to connect the camera mechanically and electrically to a higher-level unit, e.g. a vehicle.

The camera adapter comprises an adapter cover for connecting to a camera housing of the camera. The adapter cover thus facilitates the camera, in particular a camera housing, to be mechanically connected to the camera adapter.

Furthermore, once the adapter cover and the camera housing are connected, the two parts form a housing that encloses a chamber. A sensor board of the camera is accommodated in the chamber. The adapter cover therefore facilitates to form part of a chamber housing, for example the cover of the chamber. A chamber is a largely or completely enclosed cavity to protect the sensor board from external influences such as moisture and dirt. In particular, the adapter cover comprises or consists of a shielded material, preferably aluminum, to shield the interior of the chamber from electric and magnetic fields.

The camera adapter also includes a connector for connecting the camera adapter to a control unit outside the chamber. A connector, also known as a plug, is used to disconnect and connect electrical cables or, for example, cables for optical radiation. The connecting parts, i.e. connector and mating connector, can be aligned by positive locking of the connector parts, fixed in a detachable manner by spring force (contact foot) or additionally secured against unintentional loosening by screwing. In particular, the camera adapter can thus be connected to a wiring harness of a vehicle, for example.

The camera adapter also includes a waveguide for transmitting signals from the sensor board to the connector in the chamber. Transmission via a waveguide enables signals to be transmitted over greater distances inside the chamber.

A waveguide is a structure that conducts waves such as radio waves (e.g. radio frequency waveguides) or other electromagnetic waves with minimized energy loss by directionally restricting the transmission of energy. Without the restriction of a waveguide, the intensity of the waves would decrease and the necessary high bandwidths for camera signals could not be transmitted. Typically, the transmission of moving camera images requires bandwidths of several Gbit/s. In particular, the waveguide is used to transmit waves with a frequency greater than or equal to 3 MHz and less than or equal to 30 THz.

Furthermore, the camera adapter comprises a contact surface that is arranged on the waveguide, the contact surface for contacting the waveguide with the sensor board in the chamber. The contact surface enables the connection terminals of the sensor board and waveguide to be electrically contacted and thus the data can be transmitted efficiently. The contact surface can also be used to compensate for tolerances. In particular, the connector, waveguide and contact surface are different components that can be manufactured separately from each other and are only brought together when the camera adapter is manufactured.

According to the first aspect, the waveguide with the contact surface is arranged on a side wall of the camera adapter extending in the direction of the optical axis. The side wall thus extends in the direction of the optical axis. Ideally, the side wall is parallel to the optical axis. As a result of the assembly process, the side wall of a camera connected to the camera adapter is parallel to the optical axis of the camera within the tolerances.

The sensor of the sensor board is arranged perpendicular to the optical axis so that the camera can generate images with low optical errors. The sensor board has the shape of a plate, i.e. the board is much thinner in the direction of the optical axis than in the image plane, which extends at least over the surface of the sensor. A boarder at the edge of the sensor board therefore extends in the direction of the optical axis.

This arrangement makes it possible for the edge of the sensor board to be contacted in a contact direction X that is perpendicular to the optical axis of the camera. This means that no forces are transmitted to the sensor board in the direction of the optical axis. This means that the tolerances in the direction of the optical axis can be increased compared to a case in which a rear side of the sensor board is contacted.

This arrangement also means that the space in the center of the sensor board is available for other electrical units.

According to a second aspect, in addition to the first aspect, the adapter cover comprises a rear wall facing an opening defined by the side wall, and wherein the side wall protrudes from the rear wall in the direction of the opening, the opening being closable by a camera housing having optics defining the optical axis. In particular, the adapter cover may have the shape of a pot, wherein the side wall is a wall of the pot, for example to accommodate the sensor board in the pot. In other words, the rear wall is formed by a polygon and the side wall follows the edge of the polygon, for example a rectangle. Alternatively, the side wall can also be just a structure, for example a strut, which stands out from the adapter cover. These arrangements allow the side wall and rear wall to be manufactured in one piece.

According to a third aspect, in addition to the second aspect, the connector is arranged on the rear wall of the chamber. When the camera adapter and camera are mounted, the camera system can be installed in the higher-level unit to save space, as a cable harness is routed away from the camera's field of view and no further changes in the direction of the cable routing are necessary to avoid shading the camera's field of view. Alternatively, it is also possible to arrange the connector on the side wall.

According to a fourth aspect, in addition to one of the above aspects, the connector is shielded, preferably the connector is suitable for connection to a coaxial cable. A coaxial cable is a two-pole cable with a concentric structure. It consists of an inner conductor (also known as a signal conductor), which is surrounded at a constant distance by a hollow cylindrical outer conductor. The outer conductor shields the inner conductor from interference radiation. It is particularly preferable if the adapter cover and in particular the side wall are also made of a shielded material, preferably the adapter cover and/or the side wall comprise or consist of aluminum.

According to a fifth aspect, in addition to the fourth aspect, a shield of the connector is connected to the adapter cover. This means that the entire housing is shielded and the sensor board does not have to be additionally shielded.

According to a sixth aspect, in addition to any of the above aspects, the waveguide comprises a signal conductor track disposed on a dielectric substrate to form a lead frame. A lead frame is a metal structure inside or on a chip, the dielectric substrate, which conducts signals. This makes it particularly easy to route the signal line decoupled from the adapter cover and the side wall in the chamber.

According to a seventh aspect, in addition to the sixth aspect, the lead frame further comprises two shield conductor tracks, wherein the shield conductor tracks and the single conductor trace are arranged on one side of the substrate. In other words, a coplanar waveguide connects the connector and the contact surface.

A coplanar waveguide is a type of electrical planar transmission line that can be manufactured using printed circuit board technology and is used to transmit microwave signals. For example, coplanar waveguides (CPW) comprise the signal conductor track, which is applied to the dielectric substrate, e.g. printed, and a pair of shielding conductors, one on each side of the track. All three conductors are located on the same side of the substrate and are therefore coplanar. The shield conductor tracks are separated from the signal conductor track by a small gap, the width of which is constant over the entire length of the line. The shield conductor tracks generally extend away from the signal conductor track over an indefinite but large distance, so that they notionally represent a semi-infinite plane.

Coplanar waveguides transmit signals particularly effectively. They can also be used inside the chamber of the camera adapter, as the structures are protected from external influences after assembly.

According to an eighth aspect, in addition to the sixth or seventh aspect, the lead frame further comprises a rear conductor shield, wherein the rear conductor shield is arranged on a rear side of the substrate, wherein the rear side faces a front side of the substrate, wherein the single conductor is arranged on the front side. In particular, this creates a coplanar waveguide with ground.

According to a ninth aspect, in addition to any of the above aspects, the camera adapter further comprises a holder for attaching the waveguide to the housing cover. In particular, the holder may be insulating. This is particularly advantageous in order to guide the waveguide on an inner side of the chamber in a controlled manner. Furthermore, in the case of a shielding housing, the waveguide can be mounted isolated from the housing, which is advantageous for signal transmission. Furthermore, a plurality of holders can be provided to guide the waveguide over an edge in the chamber, i.e. partly on the rear wall and partly on the side wall.

According to a tenth aspect, in addition to the ninth aspect, the holder is arranged between the contact surface and the connector so that the waveguide is movable on the contact surface in a compensation direction perpendicular to the optical axis and perpendicular to the contact direction and is moveable in the contact direction. The contact surface is therefore attached to the side wall in such a way that it can be moved relative to the side wall perpendicular to the optical axis in both directions. This enables the contact surface to make contact with a camera, taking into account that the sensor board can be installed with large tolerances relative to the camera housing. Large tolerances between the sensor board and the camera housing are advantageous, as these tolerances have little effect on the imaging properties of the camera and the camera can therefore be manufactured with larger tolerances.

According to an eleventh aspect, in addition to one of the above aspects, the contact surface comprises a spring element so that the contact surface is movable in the contact direction X. Advantageously, a pressure limiter is additionally arranged on the contact surface, wherein the pressure limiter protrudes from the waveguide in the contact direction in order to prevent the spring element from overbending.

A first spring element, also known as a tolerance compensation spring, presses the waveguide against the printed circuit board. A second spring element, also known as a contact spring, allows the contact surface to be bent. The pressure limiter protects the contact spring from damage (overbending). This results in a defined contact spring force.

According to a twelfth aspect, in addition to one of the above aspects, the extension of the contact surface along the optical axis Z is larger than in a compensation direction Y which is perpendicular to the optical axis Z and perpendicular to the contact direction X to increase a tolerance for connection along the optical axis. Since contact is made from the edge, the tolerance along the optical axis can be increased by forming a contact surface that is long in the direction of the optical axis. In particular, the contact surface in the direction of the optical axis is at least twice as long as the contact surface is wide perpendicular to the optical axis.

According to a thirteenth aspect, in addition to any of the above aspects, the side wall comprises a spacer element extending perpendicular to the optical axis to limit the movement of the camera and the adapter housing in the direction of the optical axis Z. For example, the side wall comprises a groove at the edge into which the camera housing is received. The spacer element prevents the sensor from being damaged during mounting, as the side wall does not transfer any forces to the central area of the sensor board.

Although not yet mentioned in the above description, according to an alternative aspect, a camera system may comprise a camera adapter according to one of the above first to thirteenth aspects and a camera as described above.

For example, such a camera system is realized with a method of a fourteenth aspect. The method of mounting a camera having an optical axis comprises the following steps:

Insertion, in particular in the direction of the optical axis, of a sensor board into a chamber partially formed by an adapter cover of a camera adapter with a connector, the connector for connection to a control unit;

Contacting, in a contact direction, an edge of the sensor board in the chamber with a contact surface on a side wall of the camera adapter, the contact direction being perpendicular to the optical axis; and Closing the chamber in the adapter cover by connecting the adapter cover to a camera housing.

In particular, the camera adapter may be a camera adapter of any one of aspects 1 to 13. For a description of detailed aspects, reference is made to the description of aspects 1 to 13, which may supplement the fourteenth aspect in isolation.

According to a fifteenth aspect, in addition to the method of the fourteenth aspect, the method further comprises:

When the sensor board is inserted into the chamber in the direction of the optical axis, an indentation arranged on the edge of the sensor board is guided by a waveguide arranged on the side wall.

This allows the contact arranged on the waveguide to be aligned relative to the sensor board in the compensation direction, the compensation direction being perpendicular to the optical axis and perpendicular to the contact direction. In other words, the indentation on the edge of the sensor board is a kind of guide that aligns the waveguide, which is movably arranged on the side wall.

This makes it particularly easy to realize the large tolerances in the compensation direction and facilitates good contacting.

Additionally or alternatively, the method may further comprise the step of contacting, in the contact direction, an edge of the sensor board in the chamber, such that a contact pin protruding from the sensor board in the direction of the optical axis Z contacts the contact surface. This means that the edge of the sensor board does not necessarily have to be metallized.

For a better understanding of the present invention, it is explained in more detail with reference to the embodiments shown in the following figures. The same parts are provided with the same reference signs and the same component designations. Furthermore, some features or combinations of features from the different embodiments shown and described may represent independent, inventive solutions or solutions according to the invention.

Figure 2:
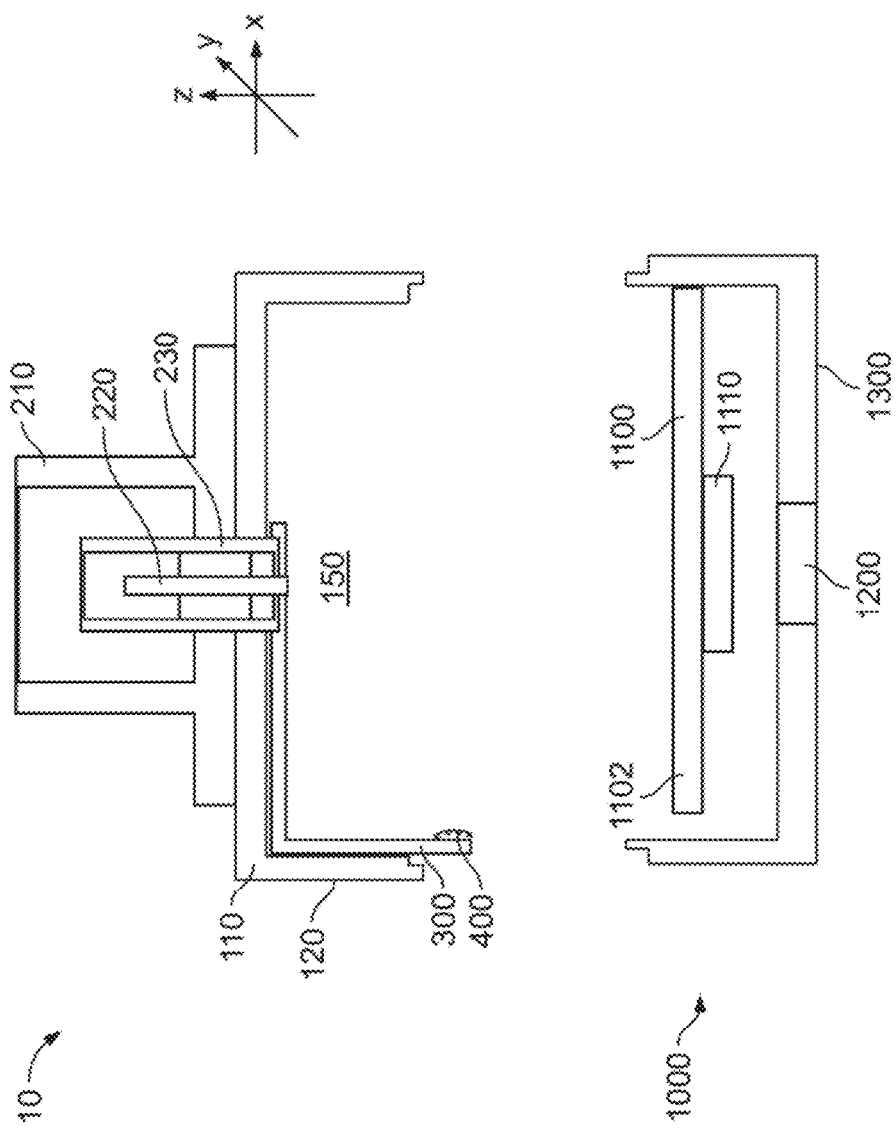
Figure 4:
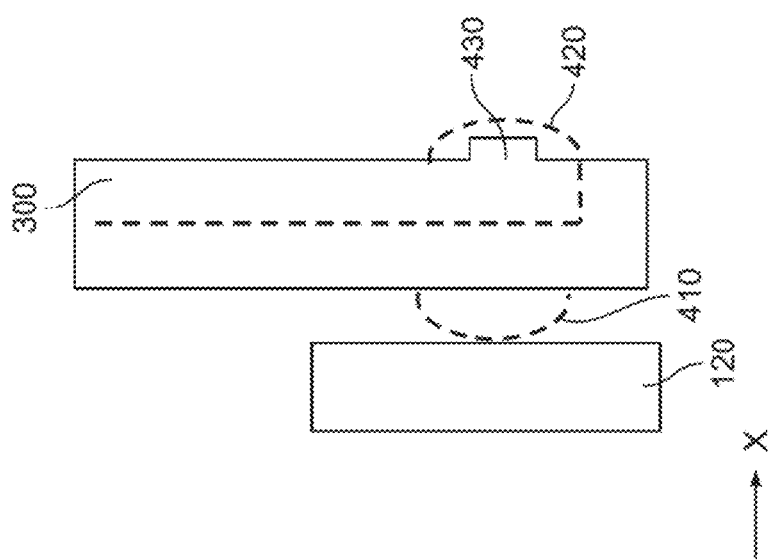
Figure 3:
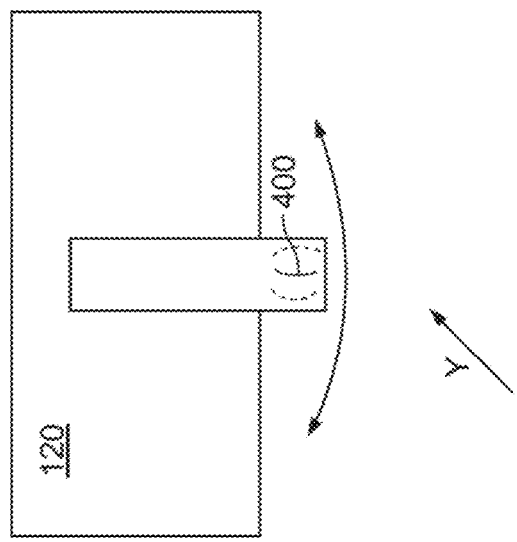
Figure 7:
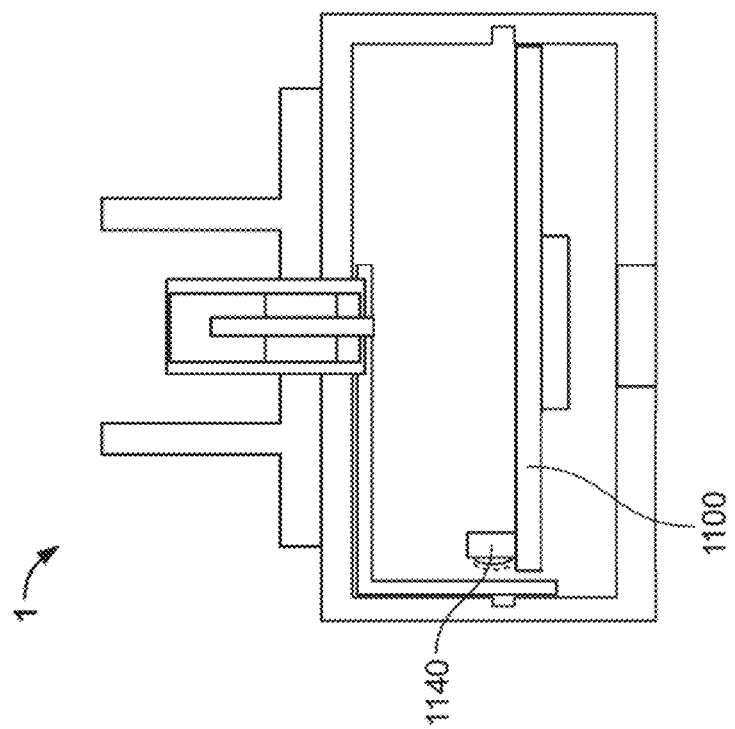
Figure 6:
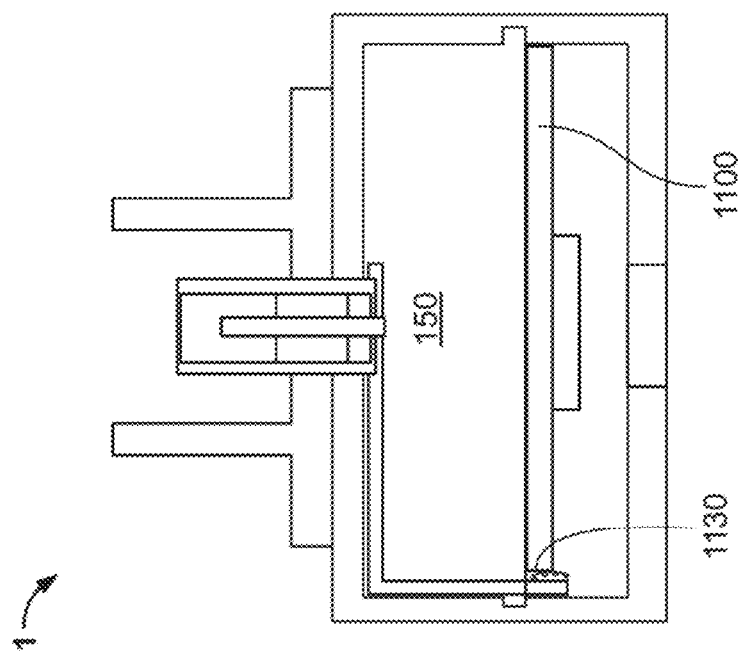
Figure 8:
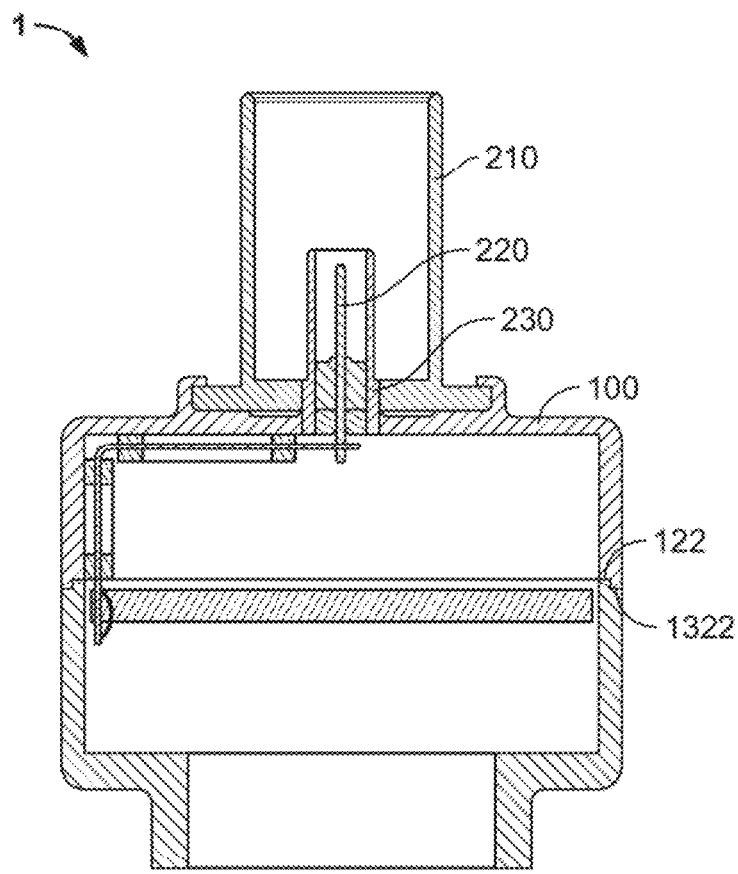
Figure 9:
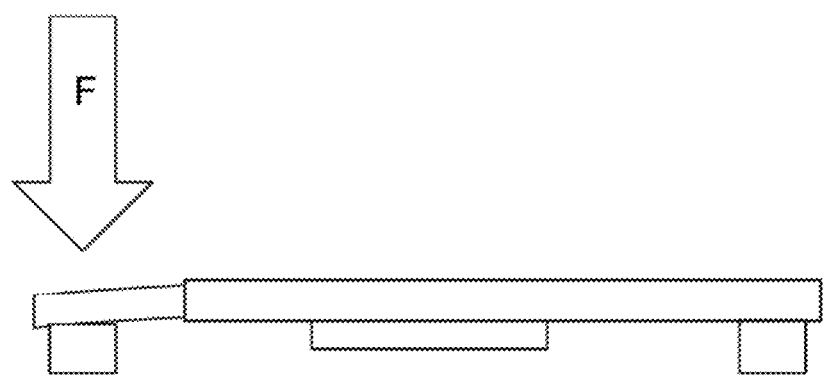
Figure 12:
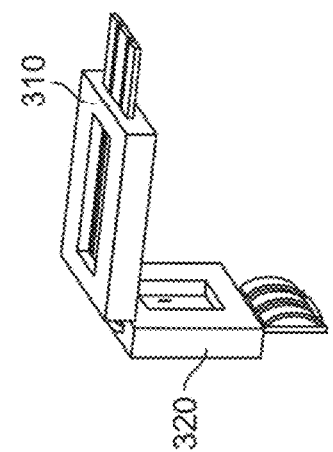
Figure 11:
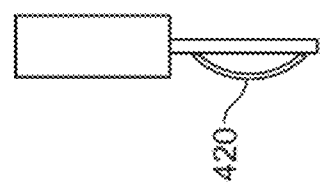
Figure 10:
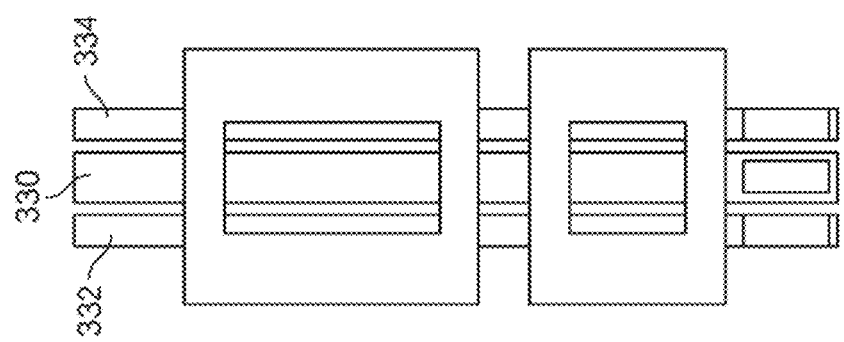
Figure 14:
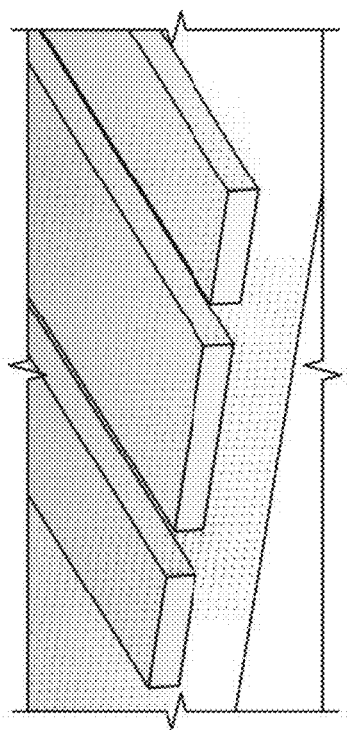
Figure 13:
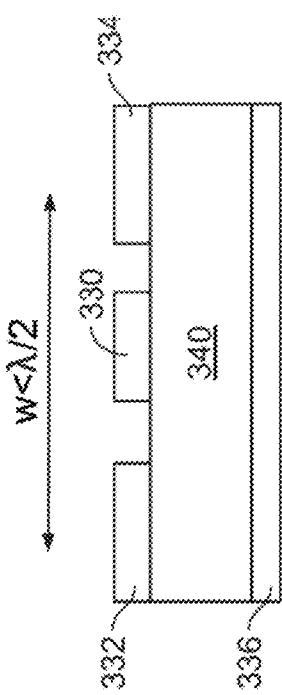

It shows:

FIG. 1 Perspective view of a camera adapter;

FIG. 2 Schematic sectional view of a camera system with camera adapter and camera before installation;

FIG. 3 Schematic view of the tolerance in the compensation direction;

FIG. 4 Schematic view of the tolerance in the connection direction;

FIG. 5 Schematic view of the connection between the sensor board and camera adapter perpendicular to the optical axis;

FIG. 6 Schematic sectional view of a camera system with camera adapter and camera after installation according to a first example;

FIG. 7 Schematic sectional view of a camera system with camera adapter and camera after installation according to a second example;

FIG. 8 Sectional view of a camera system with camera adapter and camera after installation according to a third example;

FIG. 9 Schematic view of the forces in the camera system in the direction of the optical axis;

FIG. 10 Top view of a waveguide;

FIG. 11 Side view of a waveguide;

FIG. 12 Perspective view of a waveguide;

FIG. 13 Schematic sectional view of a waveguide;

FIG. 14 Perspective sectional view of a waveguide and field strengths;

FIG. 15 Schematic sectional view of a camera system with an additional camera adapter and camera before installation;

FIG. 16 Schematic sectional view of a camera system with the additional camera adapter and camera after installation;

FIG. 17 Schematic view of the forces in the camera system from FIG. 15 in the direction of the optical axis; and FIG. 18 Schematic view of the forces in the camera system from FIG. 16 in the direction of the optical axis.

The camera adapter is now described with the aid of the figures. FIG. 1 shows a perspective view of a camera adapter 10 with an adapter cover 100, a connector 200, a waveguide 300 and a contact surface 400.

FIG. 2 shows a sectional view of a camera system with a camera adapter 10 and a camera 1000. The camera adapter 10 is used to connect the camera 1000.

The camera 1000 was described in FIGS. 15 and 16. In particular, the camera 1000 has the optical axis Z. As described above, the camera 1000 has a sensor board 1100 with a sensor 1110, an optical system 1200, wherein the optical system 1200 is held by the camera housing 1300.

The camera adapter 10 is partially formed by the adapter cover 100. The adapter cover 100 is used to connect to the camera housing 1300 of the camera 1000 to enclose a chamber 150. FIGS. 6 to 8 show the camera system after assembly. Here, the adapter cover 100 and the camera housing 1300 are connected and form the enclosed chamber 150 for the sensor board 1100 of the camera 1000.

As shown, for example, in FIG. 1, the adapter cover 100 can be formed by a rear wall 110 and a side wall 120. The rear wall 110 is opposite an opening which is defined by the side wall 120. As shown in FIGS. 1 and 2 and 6 to 8, the side wall 120 protrudes from the rear wall 110 in the direction of the opening. As shown in FIGS. 6 to 8, the opening is closed by the camera housing 1300 after assembly. Here, the camera housing 1300 holds the optics 1200, which defines the optical axis Z.

The adapter cover 100 can be made of a shielded material. For example, the adapter cover contains or consists of aluminum. In particular, the adapter cover 100 can be an extruded housing. The side wall 120 and the rear wall 110 can form the adapter cover 100 in one piece.

Furthermore, as shown for example in FIG. 1, spacer elements 122 and 124, which extend perpendicular to the optical axis Z, can be provided on the side wall 120.

For example, the spacer element can be the edge of the side wall 120. In addition, a groove 122 for connecting to the camera housing may be provided on the edge of the side wall 120 as a spacer element. The groove 122, which forms an elongated recess, may cooperate with a mating groove 1322 on the camera housing 1300, as shown in FIG. 8, to limit the movement of the camera relative to the adapter housing in the direction of the optical axis Z.

Additionally or alternatively, as shown in FIG. 1, the spacer element 124 may be a fastening element 124 for connecting to the sensor board. For example, the sensor board may be supported on the attachment element 124, which forms a columnar protrusion, to limit the movement of the sensor board of the camera relative to the adapter housing in the direction of the optical axis Z. Thus, the sensor board is held in the chamber and the movement of the sensor board after mounting is restricted.

FIG. 2 shows the connector 200. Like the connector in FIG. 15, the connector 200 is formed by a connector housing 210, a connecting contact 220 and a shielding element 230. The connector 200 is used to connect the camera adapter 10 to a not shown control unit outside the chamber 150. The connector 200 is therefore a shielded connector, for example a coaxial cable as shown in FIGS. 1 and 8.

As shown, for example, in FIG. 8, the shield 230 is connected to the adapter cover 100. The connector 200 further comprises the connector housing 210, which may be made of plastic or may comprise plastic. The connector housing 210 protects the connecting contact 220 and the shielding element 230.

The connector 200 may be arranged on the rear wall 110 of the adapter cover 110. In other words, the connector is arranged on a side of the camera system opposite the optics 1300. As exemplified in FIGS. 1 and 8, the connector 200 may be large compared to the electrical connections in the chamber. Thus, even a compact camera system can be easily handled.

Furthermore, as shown in FIGS. 1 and 2, the camera adapter 10 comprises a waveguide 300 for transmitting signals from the sensor board 1100 to the connector 200, the waveguide 300 being arranged in the chamber 150. A contact surface 400 is arranged on the waveguide 300. The contact surface 400 establishes an electrical contact between the waveguide 300 and the sensor board 1100 in the chamber. The waveguide 300 with the contact surface 400 is arranged on the side wall 120 of the camera adapter 10, which extends in the direction of the optical axis Z, in order to contact an edge 1102 of the sensor board 1100 in a contact direction X, which is perpendicular to the optical axis Z of the camera 1000.

As shown in FIG. 1, a first holder 310 is provided for fastening the waveguide 300 to the rear wall 110 of the adapter cover 100. Additionally or alternatively, a second holder 320 is provided for securing the waveguide 300 to the side wall 120 of the adapter cover 100. Each of the holders 310, 320 enables the waveguide 300 to be guided in the chamber 150 in a controlled manner, which is particularly necessary as the assembly is carried out without visual inspection. In particular, the holders comprise an insulating material or are made of an insulating material.

Furthermore, as shown in FIG. 1, the holders are arranged between the contact surface 400 and the connector 200, namely one on the rear wall 110 and one on the side wall 120. Thus, the waveguide can be guided over the edge, which is advantageous when the connector is arranged on the rear wall 110.

The second holder 320, which is disposed centrally on the side wall 120, serves to increase the tolerances, as will be further explained with reference to FIGS. 3 and 5.

As shown in FIG. 3, the waveguide 300 can be arranged movably relative to the side wall 120 at the contact surface 400 in a compensation direction Y, which is perpendicular to the optical axis Z and perpendicular to a contact direction X, by the holder 320.

In addition, as shown for example in FIG. 5, the sensor board 1100 can have an indentation 1120, which is arranged at the edge 1102 of the sensor board. The indentation 1120 guides the waveguide 300, on which the contact surface 400 is arranged and which is arranged on the side wall 110, during assembly. This ensures that the contacting of the waveguide 300 to the sensor board 1100 is aligned in the compensation direction Y. Thus, even with large tolerances in the compensation direction Y, it can be ensured that the contact surface 400 reliably contacts the sensor board.

Furthermore, as shown in FIG. 4, the waveguide can be arranged movably on the contact surface in a contact direction X, which is perpendicular to the optical axis Z, by means of the holder 320.

In addition, as shown for example in FIG. 4, the contact surface 400 can comprise spring elements 410 and 420, so that the contact surface 400 can be moved in the contact direction X. In particular, a tolerance compensation spring 410 can be provided between the side wall 120 and the waveguide 300. This pretensions the contact surface 400. Furthermore, a contact spring 420 can be provided between the waveguide 300 and the sensor board. Both springs help to ensure that the tolerances in contact direction X can be compensated.

As also shown in FIG. 4, a pressure limiter 430 is arranged on the contact surface, with the pressure limiter 430 projecting from the waveguide in the contact direction X in order to prevent overbending of the contact spring 420. The pressure limiter 430 protects the contact spring from damage (overbending). This results in a defined contact spring force.

Furthermore, as shown in FIGS. 1 and 2, the extension of the contact surface 400 along the optical axis Z is greater than in the compensation direction Y. Thus, a tolerance for the connection along the optical axis Z is increased.

Next, FIGS. 6 to 8 describe a camera system 1 in which the camera adapter 10 from FIGS. 1 and 2 is connected to a camera 1000, as shown in FIG. 2. It should be noted that FIG. 8 only shows the sensor board without the sensor.

The following method can be used for mounting. The method first comprises the step of inserting a sensor board 1100 into a chamber 150, the chamber being partially formed by the adapter cover 100 of the camera adapter 10. Further, the method comprises the step of contacting, in the contact direction X, the edge 1102 of the sensor board 1100 in the chamber 150 with a contact surface 400 on the side wall 120 of the camera adapter 10, wherein the contact direction X is perpendicular to the optical axis Z. Finally, the method comprises closing the chamber 150 in the adapter cover 100 by connecting the adapter cover 100 to the camera housing 1300.

These steps can be carried out simultaneously, namely when the sensor board 1100 is pre-assembled in the camera housing 1300. This means that the contacting step can take place without visual inspection. Since the sensor board 1100 is usually installed with tolerances in the camera housing 1300, the camera adapter 10 facilitates to compensate for these tolerances. The measures for compensating for the tolerances have already been described above, in particular with reference to FIGS. 1 to 5.

A further advantage of the arrangement is described with reference to FIG. 9. In particular, forces only act on the edge of the sensor board during assembly. Thus, the case as described in FIGS. 17 and 18 can be avoided, namely that the sensor 1110 detaches from the sensor board during blind assembly.

FIG. 6 shows a first example of a sensor board, where a contact 1130 is arranged on an edge of the sensor board 1100. This space-saving solution is possible because edges, i.e. an edge that extends in the direction of the optical file Z, can be metallized. In particular, the chamber 150 can be reduced in size. Advantageously, this arrangement is combined with the solution described in FIG. 5, namely that the sensor board 1100 comprises an indentation for guiding the waveguide.

FIG. 7 shows a second example of a sensor board, wherein a contact pin 1140 is arranged at the edge of the sensor board 1100. The contact pin 1140 protrudes from the sensor board 1100 in the direction of the optical axis Z. The advantage is that further galvanic surfaces can be formed on the contact pin, which may be more suitable for a connection.

The camera systems of FIGS. 6 to 8 are non-detachably connected, e.g. the adapter cover is welded to the camera housing. In particular, the adapter cover and the camera housing can be made of the same material or comprise the same material.

The waveguide 300 with the contact surface 400 is described in FIGS. 10 to 14. In particular, as shown in FIG. 10, the waveguide 300 comprises a signal conductor track 330 and two shield conductor tracks 332, 334. For example, as shown in FIG. 13, the signal conductor track 330 and the shield conductor tracks 332, 334 may be arranged on one side of a dielectric substrate 340. Furthermore, a rear conductor shield 336 arranged on a rear side of the substrate may be provided.

A field distribution of a waveguide with a signal conductor track 330 and two shield conductor tracks 332, 334 is shown in FIG. 14, for example.

Furthermore, FIG. 11 shows that the contact surface 400, which was described in particular with reference to FIG. 4, can be shaped as a contact spring 420. Furthermore, FIG. 12 shows that the two holders 310, 320, which have been described in particular with reference to FIG. 1, are suitable for guiding the waveguide over two at least angled inner surfaces of the adapter cover.

It should be noted that the shield conductors 332, 334, as shown in FIGS. 1 and 8, are connected to the shield of the connector 200, which is connected to the adapter cover. It is also possible that the shielding conductors contact the housing between the contact surface 400 and the connector 200. Furthermore, FIG. 5 shows that during the assembly of the adapter cover and the camera housing, the shield conductors 332, 334 are also connected to contacts on the printed circuit board in addition to the signal conductor 330.

The connection of the signal conductor 330 to the plug contact 220 is shown, for example, in FIGS. 1 and 8.

The above description assumes that the higher-level unit is a vehicle, for example. However, the higher-level unit is not necessarily a vehicle and can be any device that uses camera data, e.g. a machine tool.

| List of reference symbols: | |
|---|---|
| Reference number | Description |
| 1 | Camera system |
| 10 | Camera adapter |
| 100 | Adapter cover |
| 110 | Rear wall |
| 120 | Side wall |
| 122 | Groove |
| 124 | Fastening element |
| 200, 2200 | Connector |
| 210, 2210 | Connector housing |
| 220, 2220 | Plug contact |
| 230, 2230 | Shielding element |
| 300 | Waveguide |

-continued

| List of reference symbols: | |
|---|---|
| Reference number | Description |
| 310, 320 | Holder |
| 330 | Signal conductor track |
| 332, 334 | shield conductor track |
| 400 | Contact surface |
| 410 | Tolerance compensation spring |
| 420 | Contact spring |
| 430 | Pressure limiter |
| 1000 | Camera |
| 1100 | Sensor board |
| 1102 | Edge of the sensor board |
| 1110 | Sensor |
| 1120 | Socket, connecting unit |
| 1130 | Contact us |
| 1140 | Contact pin |
| 1200 | Optics |
| 1300 | Camera housing |
| 1322 | Counter groove |
| 1302 | Fastening element |
| 2000 | Camera adapter |
| 2100 | Adapter cover |

The invention claimed is:

1. A camera adapter for connecting a camera having an optical axis, the camera adapter comprising:
an adapter cover for connection to a camera housing of the camera, wherein the adapter cover and the camera housing form a chamber for a sensor board of the camera;
a connector for connecting the camera adapter to a control unit outside the chamber;
a waveguide for transmitting signals from the sensor board to the connector, the waveguide being guided within the chamber;
a contact surface arranged on the waveguide, the contact surface for contacting the waveguide with the sensor board in the chamber;
wherein the waveguide is arranged with the contact surface on a side wall of the camera adapter extending in the direction of the optical axis in order to contact an edge of the sensor board in a contact direction which is perpendicular to the optical axis of the camera.

2. The camera adapter according to claim 1, wherein the adapter cover further comprises a rear wall, wherein the rear wall faces an opening defined by the side wall, and wherein the side wall protrudes from the rear wall in the direction of the opening, wherein the opening is closable by the camera housing with optics defining the optical axis.

3. The camera adapter according to claim 2, wherein the connector is arranged on the rear wall of the adapter cover.

4. The camera adapter according to claim 1, wherein the connector is shielded, preferably a coaxial cable, and/or wherein the adapter cover is made of a shielded material, preferably wherein the adapter cover comprises aluminum.

5. The camera adapter according to claim 4, wherein a shield of the connector is connected to the adapter cover.

6. The camera adapter according to claim 1, the waveguide comprising a signal conductor track arranged on a dielectric substrate to form a lead frame.

7. The camera adapter according to claim 6, the lead frame further comprising two shield conductor tracks, wherein the shield conductor tracks and the signal conductor track are arranged on one side of the substrate.

8. The camera adapter according to claim 6, the lead frame further comprising a rear conductor shield, wherein the rear conductor shield is arranged on a rear side of the substrate, the rear side facing a front side of the substrate, wherein the single conductor is arranged on the front side.

9. The camera adapter according to claim 1, further comprising a holder for attaching the waveguide to the adapter cover, in particular wherein the holder comprises an insulating material.

10. The camera adapter according to claim 9, wherein the holder is arranged between the contact surface and the connector so that the waveguide is movable on the contact surface in an compensation direction which is perpendicular to the optical axis and perpendicular to the contact direction, and is moveable in the contact direction.

11. The camera adapter according to claim 1, wherein the contact surface comprises a spring element, so that the contact surface is movable in the contact direction, in particular wherein a pressure limiter is arranged on the contact surface, the pressure limiter protrudes from the waveguide in the contact direction in order to prevent overbending of the spring element.

12. The camera adapter according to claim 1, wherein the extension of the contact surface along the optical axis is larger than in a compensation direction perpendicular to the optical axis and perpendicular to the contact direction to increase a tolerance to the connection along the optical axis.

13. The camera adapter according to claim 1, wherein the side wall comprises a spacer element extending perpendicular to the optical axis to limit the movement of the camera relative to the adapter housing in the direction of the optical axis.

14. A method of mounting a camera system having a camera with an optical axis, the method comprising:
inserting a sensor board into a chamber partially formed by an adapter cover of a camera adapter with a connector, the connector for connecting to a control unit;
contacting, in a contact direction, an edge of the sensor board in the chamber with a contact surface on a side wall of the camera adapter, wherein the contact direction is perpendicular to the optical axis;
closing the chamber in the adapter cover by connecting the adapter cover to a camera housing.

15. The method according to claim 14 wherein the
inserting, in the direction of the optical axis, the sensor board into the chamber (150), further comprising that an indentation arranged at the edge of the sensor board is guided through a waveguide, on which the contact surface is arranged and which is arranged on the side wall, is guided through the indentation in order to align the contacting of the waveguide to the sensor board in the compensation direction, the compensation direction being perpendicular to the optical axis and perpendicular to the contact direction;
and/or
contacting, in the contact direction, an edge of the sensor board in the chamber further comprises that a contact pin, which protrudes from the sensor board in the direction of the optical axis, contacts the contact surface.

* * * * *